(12) United States Patent
Burgoon et al.

(10) Patent No.: US 7,438,161 B2
(45) Date of Patent: Oct. 21, 2008

(54) QUICK RELEASE REMOVABLE BRIDGE CALIPER

(75) Inventors: Donald Burgoon, Gastonia, NC (US); Darrick Dong, Charlotte, NC (US); Grafton Robertson, Tijeras, NM (US); Wenqi Qian, Fort Mill, SC (US)

(73) Assignee: Performance Friction Corporation, Clover, SC (US)

( * ) Notice: Subject to any disclaimer, the term of this patent is extended or adjusted under 35 U.S.C. 154(b) by 0 days.

(21) Appl. No.: 11/229,326

(22) Filed: Sep. 16, 2005

(65) Prior Publication Data

US 2006/0213730 A1  Sep. 28, 2006

Related U.S. Application Data

(60) Provisional application No. 60/610,543, filed on Sep. 17, 2004.

(51) Int. Cl.
*F16D 55/00* (2006.01)

(52) U.S. Cl. .................................. 188/73.32

(58) Field of Classification Search ............ 188/73.32, 188/73.33, 73.34, 73.47, 73.31
See application file for complete search history.

(56) References Cited

U.S. PATENT DOCUMENTS

| | | | | |
|---|---|---|---|---|
| 353,218 A | * | 11/1886 | Harrington ................ 301/120 |
| 3,532,192 A | * | 10/1970 | Falk ........................ 188/73.43 |
| 3,561,572 A | * | 2/1971 | Flegl et al. ................ 188/73.32 |
| 3,602,328 A | * | 8/1971 | Fannin et al. .............. 188/72.5 |
| 3,677,373 A | * | 7/1972 | Lucien ..................... 188/73.32 |
| 3,899,052 A | * | 8/1975 | Burnett et al. ............ 188/73.32 |
| 4,055,237 A | * | 10/1977 | Numazawa et al. ....... 188/73.35 |
| 4,168,767 A | * | 9/1979 | Brimaud .................... 188/76 |
| 4,341,289 A | * | 7/1982 | Smith ....................... 188/73.39 |
| 4,498,564 A | * | 2/1985 | Tamura ..................... 188/73.32 |
| 4,535,873 A | * | 8/1985 | Airheart .................... 188/72.4 |
| 4,570,759 A | * | 2/1986 | Ferret Bofill et al. ..... 188/73.32 |
| 4,576,257 A | * | 3/1986 | Carre et al. .............. 188/73.32 |
| 4,606,439 A | * | 8/1986 | Meynier et al. ........... 188/73.32 |
| 4,773,511 A | * | 9/1988 | Giering et al. ............ 188/73.38 |
| 4,860,865 A | * | 8/1989 | Montalvo et al. ........... 192/70 |
| 5,052,525 A | * | 10/1991 | Ekola ....................... 188/73.32 |
| 5,205,383 A | * | 4/1993 | Terashima ................ 188/73.45 |
| 5,402,865 A | * | 4/1995 | Harker ...................... 188/71.5 |
| 5,875,873 A | * | 3/1999 | Kay et al. ................. 188/73.38 |
| 6,302,243 B1 | * | 10/2001 | Ruiz ........................... 188/73.1 |
| 6,705,437 B2 | * | 3/2004 | Severinsson et al. ..... 188/73.32 |
| 6,811,004 B1 | * | 11/2004 | McCann et al. ............ 188/72.9 |
| 7,137,488 B2 | * | 11/2006 | Gilliland ................... 188/73.47 |

* cited by examiner

*Primary Examiner*—Robert A. Siconolfi
*Assistant Examiner*—Mariano Sy
(74) *Attorney, Agent, or Firm*—Roberts Mlotkowski Safran & Cole, P.C.

(57) ABSTRACT

A brake caliper has a removable bridge that acts as a rigid mount for a pair of brake pad holders. The removable bridge is retained on the caliper body by spring loaded push button that allows quick removal for replacement of the brake pads, which is especially suited for automotive racing situations. The bridge is snapped in place and rigidly retained on caliper body when in use.

17 Claims, 9 Drawing Sheets

Prior Art

FIG. 8D

Prior Art

FIG. 8E

QUICK RELEASE REMOVABLE BRIDGE CALIPER

RELATED APPLICATIONS

This application claims priority under 35 U.S.C. §119(e) to provisional application No. 60/610,543 filed Sep. 17, 2004. The contents of this priority application are incorporated herein by reference.

BACKGROUND OF THE INVENTION

1. Field of the Invention

This invention relates to brake calipers for use with disc brakes.

2. Discussion of Related Art

In typical disc brake assemblies, a rotor is mounted on a wheel hub for rotation. One or more pairs of brake pads, generally designed as friction material carried on a backing plate, are supported on either side of the rotor by a caliper or an anchor bracket. Calipers are designed to apply the braking force by moving a piston relative to the rotor to thereby move the brake pad into and out of contact with the rotor. The pistons are supported in a bore and abut the backing plate of the brake pad to move the brake pad toward the rotor upon application of a braking force. The caliper can be hydraulically actuated, for example, to selectively press the brake pads against the surface of the rotor to stop the rotation of the rotor and hence the wheel hub by forcing hydraulic brake fluid into the piston bore.

The brake pads, which include friction elements, require periodic replacement due to wear. This is especially true in automotive racing where pads may require replacement during a race. In this situation, quick and easy removal is highly desirable.

Figure 8A:
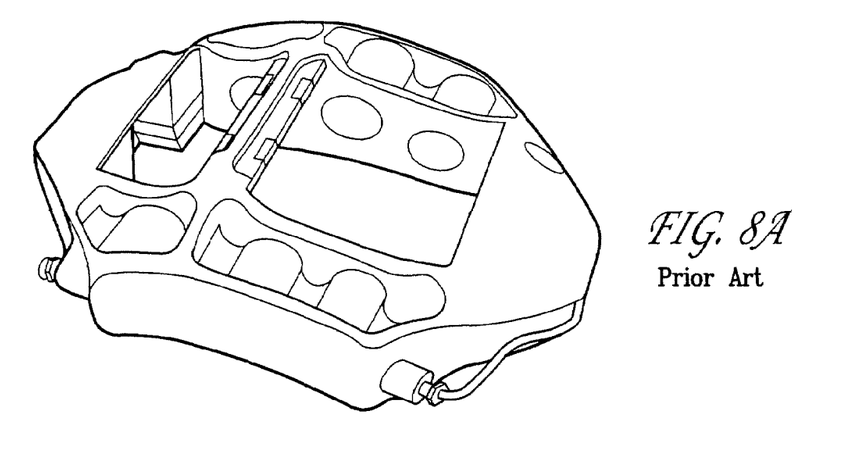
FIG. 8A is a side perspective view of a prior art device.

The prior art has addressed this problem in several different ways. It is known, for example, to replace the entire caliper assembly, including the brake pad. In this case, the brake pads are constrained by a bridge integrally formed with the caliper body, an example of which is shown in FIG. 8A. To replace the brake pad, the caliper assembly must be entirely removed from the vehicle. The advantage of this design is that the bridge provides a maximum degree of stiffness, which enhances braking performance, since it is integrally formed with the caliper body. However, as can be appreciated, removal of the entire caliper assembly requires significant effort. The replacement requires an extended change time.

Figure 8B:
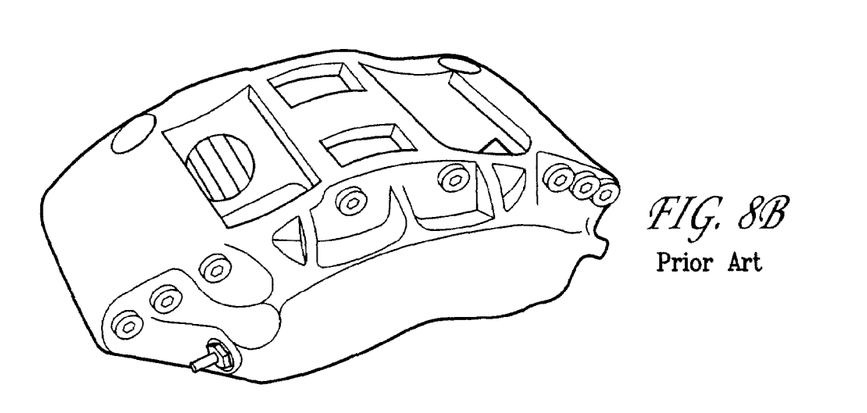
FIG. 8B is a side perspective view of a prior art device.

In another known method of replacement, the bridge is bolted to the caliper body on both sides, as seen in FIG. 8B. The bridge often is formed as an H and two bolts rigidly securing the bridge to the caliper body. Removal and replacement is still complicated as multiple bolts must be removed and reinstalled during replacement, but the change time is less than removing the entire caliper assembly in the integral bridge design.

Figure 8C:
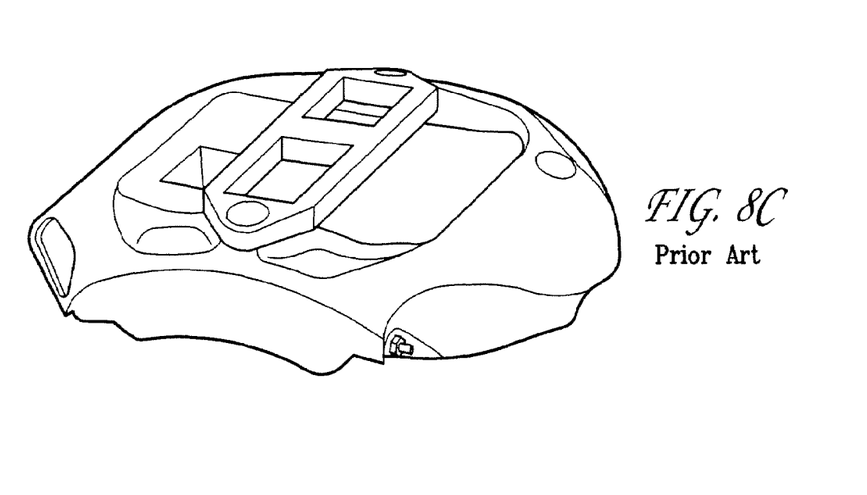
FIG. 8C is a side perspective view of a prior art device.

To decrease change time, one design offers a hinge on one side of the bolted bridge. This type of design is shown in FIG. 8C. That way, a bolt on only one side needs to be removed to swing the bridge and allow for pad replacement. This design offers comparable stiffness to the fully bolted bridge design and allows slightly faster change time.

Figure 8D:
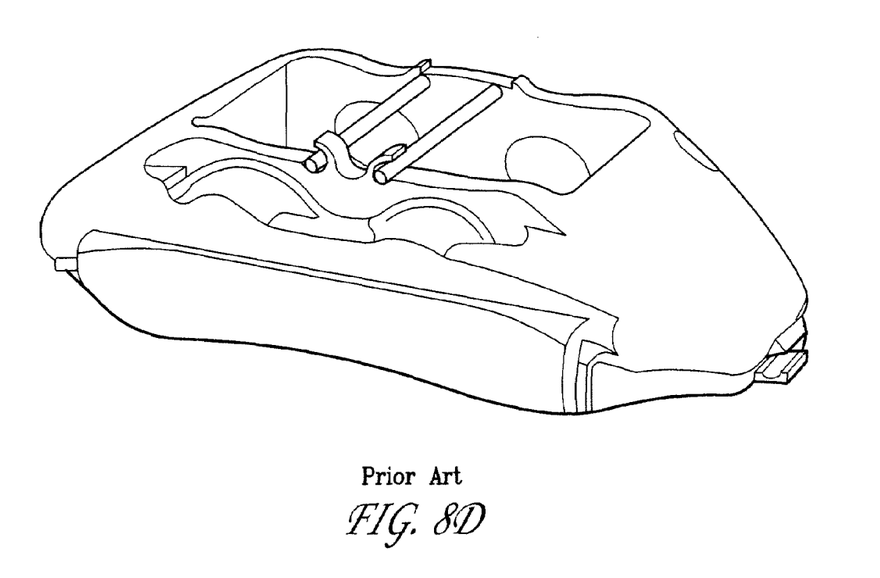
FIG. 8D is a side perspective view of a prior art device.
Figure 8E:
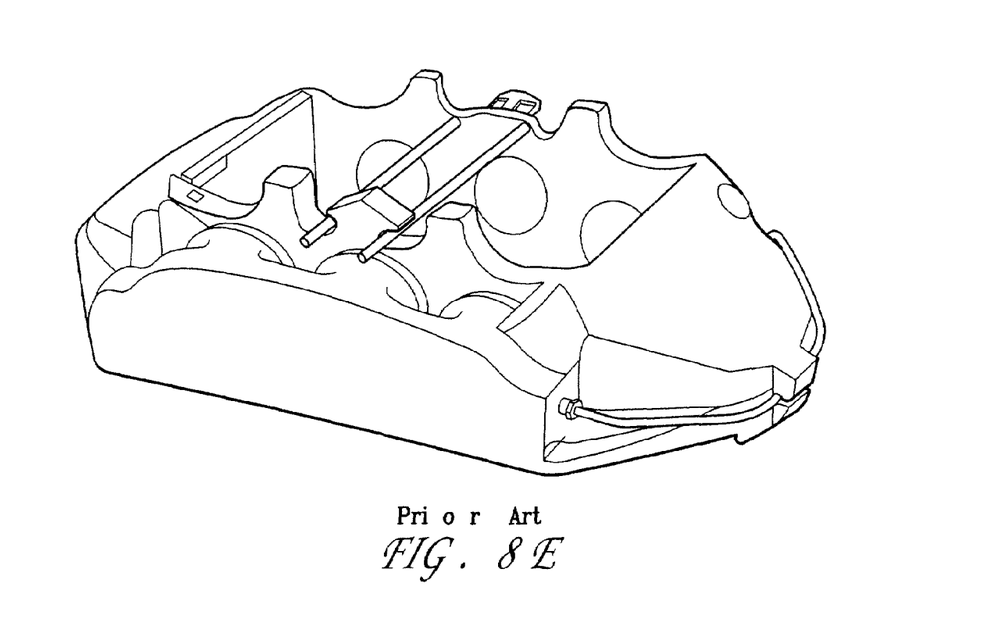
FIG. 8E is a side perspective view of a prior art device.

To alleviate the bolting issue, some race caliper manufacturers have replaced the bridge with a spring clamp for quick pad changes, as illustrated in FIG. 8D. The spring clamp holds the pads in vertically, similar to the integral and bolted bridges, but does not offer the stiffness of the integral and bolted bridges. It has also been know to offer combined spring clamp and bolted bridge design so that the design can be chosen based on the particular event and pad change requirements, as shown in FIG. 8E.

Thus, there is a need for a caliper that allows quick pad removal while offering a high degree of caliper stiffness.

SUMMARY OF THE INVENTION

An aspect of embodiments of the invention is to provide a caliper assembly with a bridge designed for quick brake pad removal and replacement.

Another aspect of embodiments of the invention is to provide a caliper assembly that offers stiffness, particularly with respect to the brake pad supporting bridge.

These and other aspects of the invention can be realized by embodiments of the invention in which a caliper assembly comprises a caliper body, a bridge releasably secured to the caliper body, at least one brake pad mounted to the bridge, and a push button latch assembly provided between the caliper body and the bridge.

The invention is also directed to a brake assembly comprising a caliper body, a pair of brake pads slidably retained by the caliper body, a removable bridge rigidly coupled to the caliper body and supporting the pair of brake pads, wherein the removable bridge has a snap release connection at each end that releasably connects to the caliper body.

The invention further relates to a method of replacing brake pads on a vehicle comprising providing a caliper that supports a brake pad on a bridge mounted to a caliper body, compressing a button on the bridge to disconnect the bridge from the caliper body, removing the brake pad from the bridge, mounting a replacement brake pad on the bridge, and snapping the bridge with the replacement brake pad onto the caliper body.

The invention encompasses the caliper assembly, the brake assembly, and method above in combination with a vehicle, especially a racing vehicle.

DETAILED DESCRIPTION OF PREFERRED EMBODIMENTS

This invention is described for use in a vehicular disc brake system. The caliper described below is used for illustrative purposes only and it will be understood that this invention may be used in various types of braking systems and with any rotor.

Figure 1:
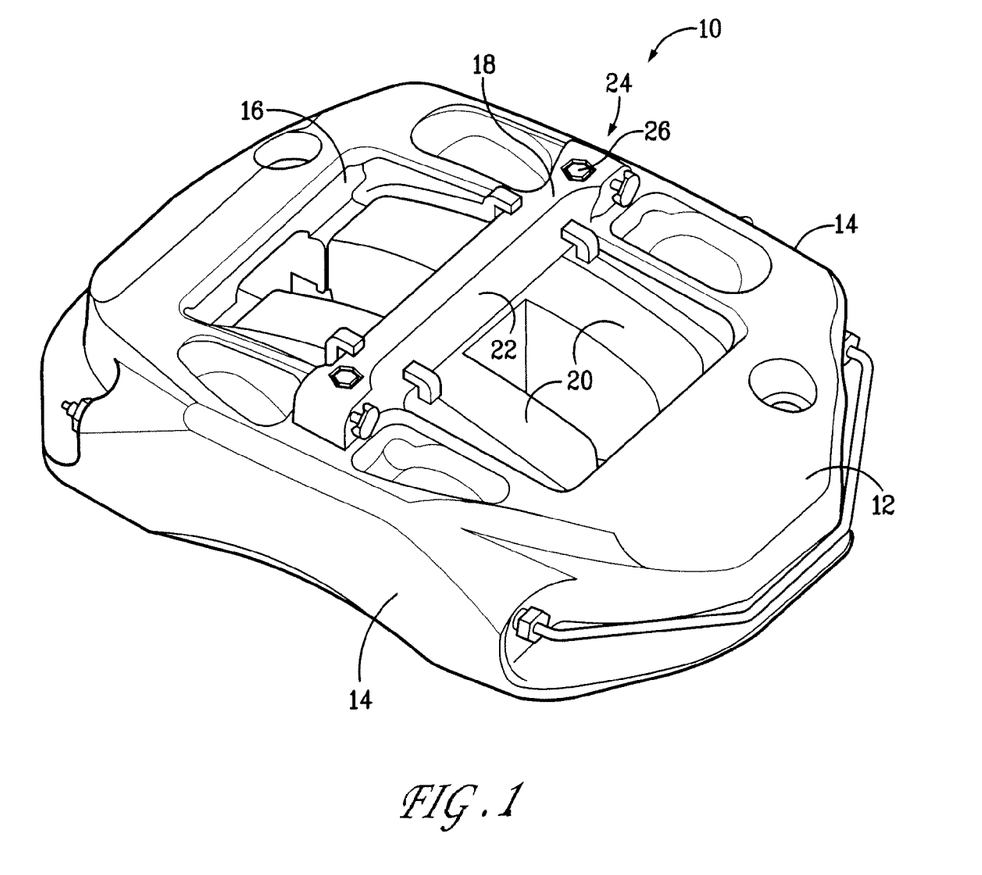
FIG. 1 is a side perspective view of a caliper assembly in accordance with the invention.
Figure 2:
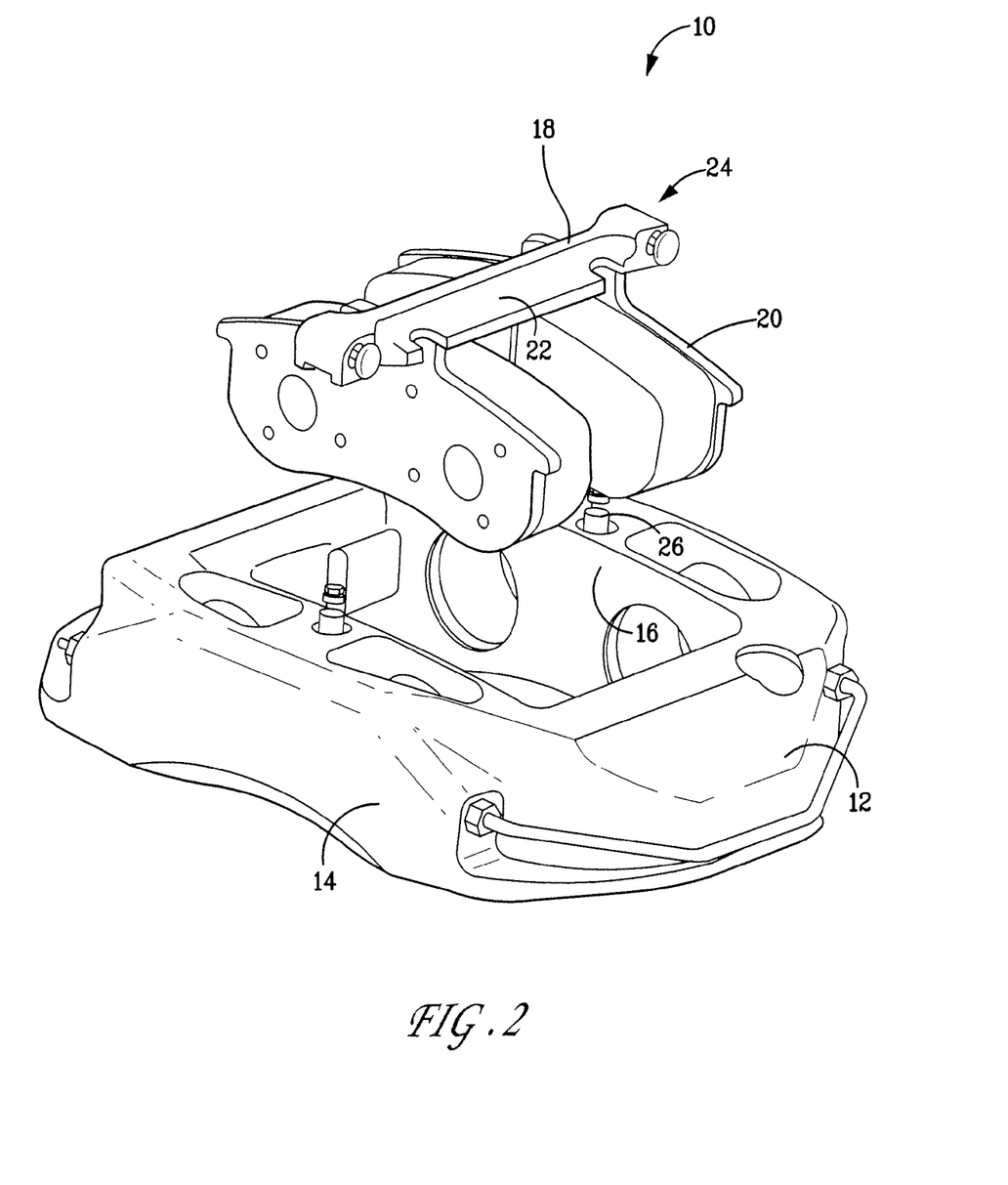
FIG. 2 is a side perspective view of the caliper assembly of FIG. 1 with the bridge and brake pads removed.

Referring to FIGS. 1 and 2, a brake caliper assembly 10 includes a caliper body 12 that has side portions 14 and a central opening 16. A bridge 18 is releasably connected to the top of the caliper body 12. Brake pads 20, which are formed by friction material carried on a backing plate, are slidably mounted on the longitudinal sides 22 of the bridge 18. The sides 22 act as rails that the brake pads slide on to selectively clamp a brake rotor disc, as is known. The brake pads 20 are designed to move toward each other by pistons, not shown, to press on the rotor to effect braking of a vehicle. The bridge 18 is releasably connected to the caliper body 12 by a spring loaded latch assembly 24, described in detail below.

Figure 3:
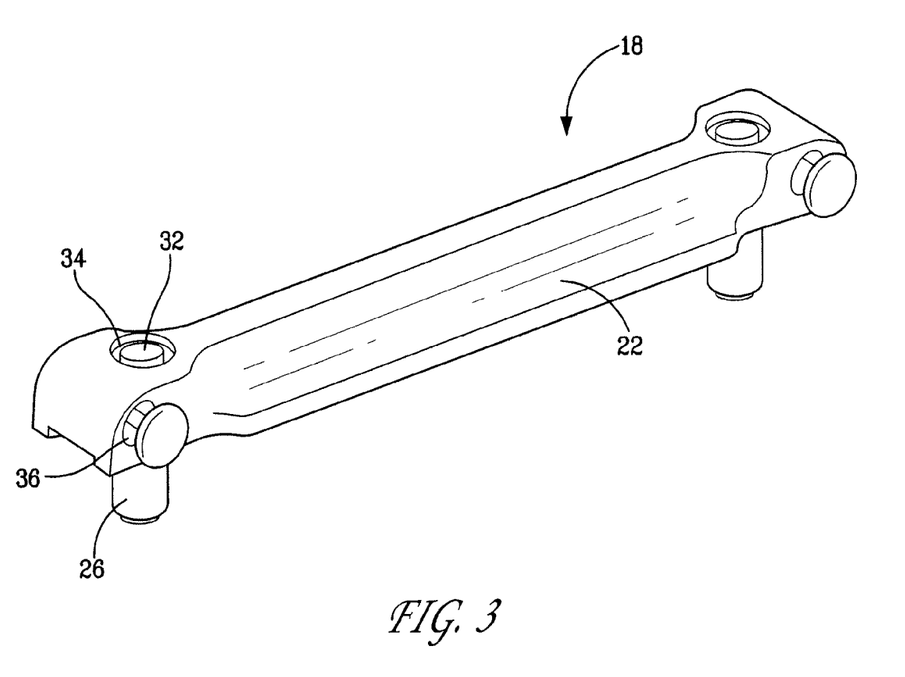
FIG. 3 is a side perspective view of the bridge attached to the pins extending from the caliper body.
Figure 7:
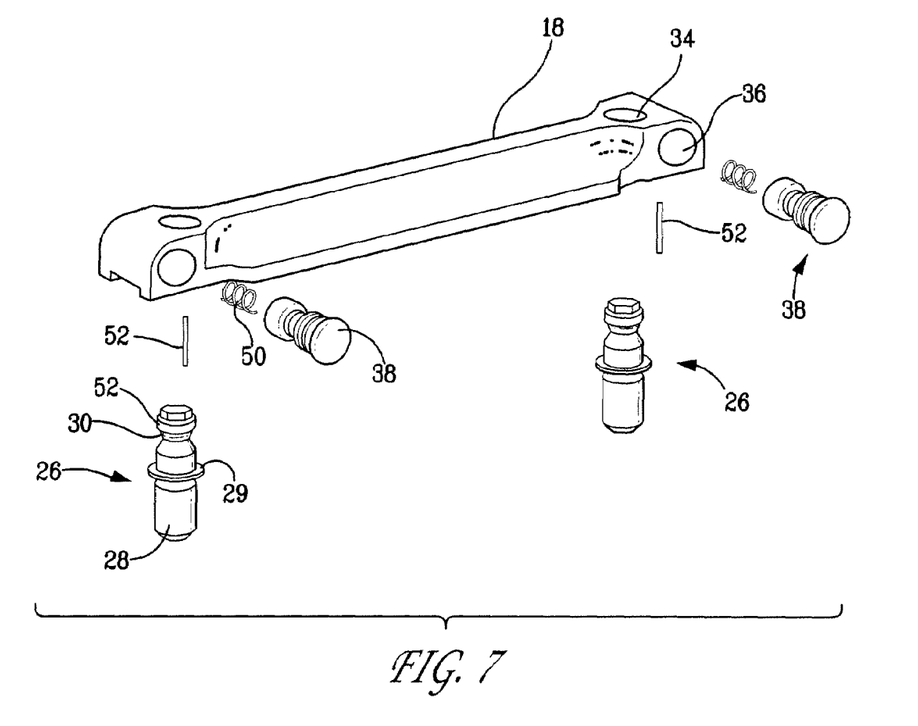
FIG. 7 is an exploded side perspective view of the bridge and latch assembly.

As seen in FIGS. 2, 3, and 7, in detail, a pin 26 protrudes upwardly from the caliper body 12 on each side. The pin 26 has a post 28 that fits into a recess in the caliper body 12. An annular shoulder 29 protrudes outwardly from the post 28. The top of the pin 26 has an annular groove 30 that forms a head 32.

Figure 4:
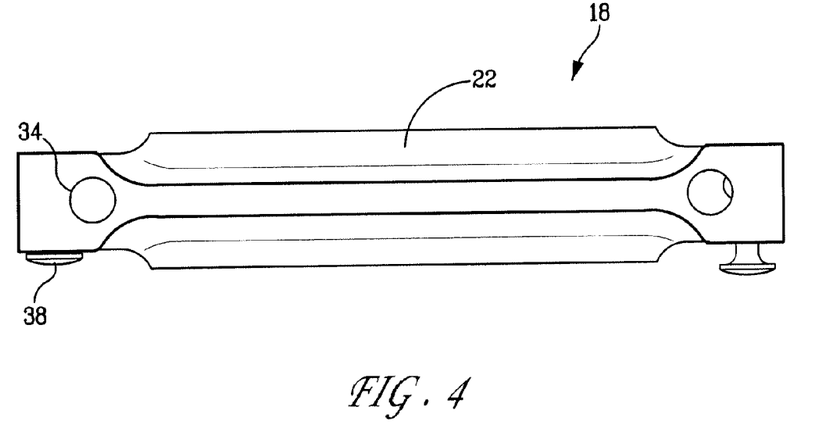
FIG. 4 is a top view of the bridge showing the two positions of the buttons.
Figure 5:
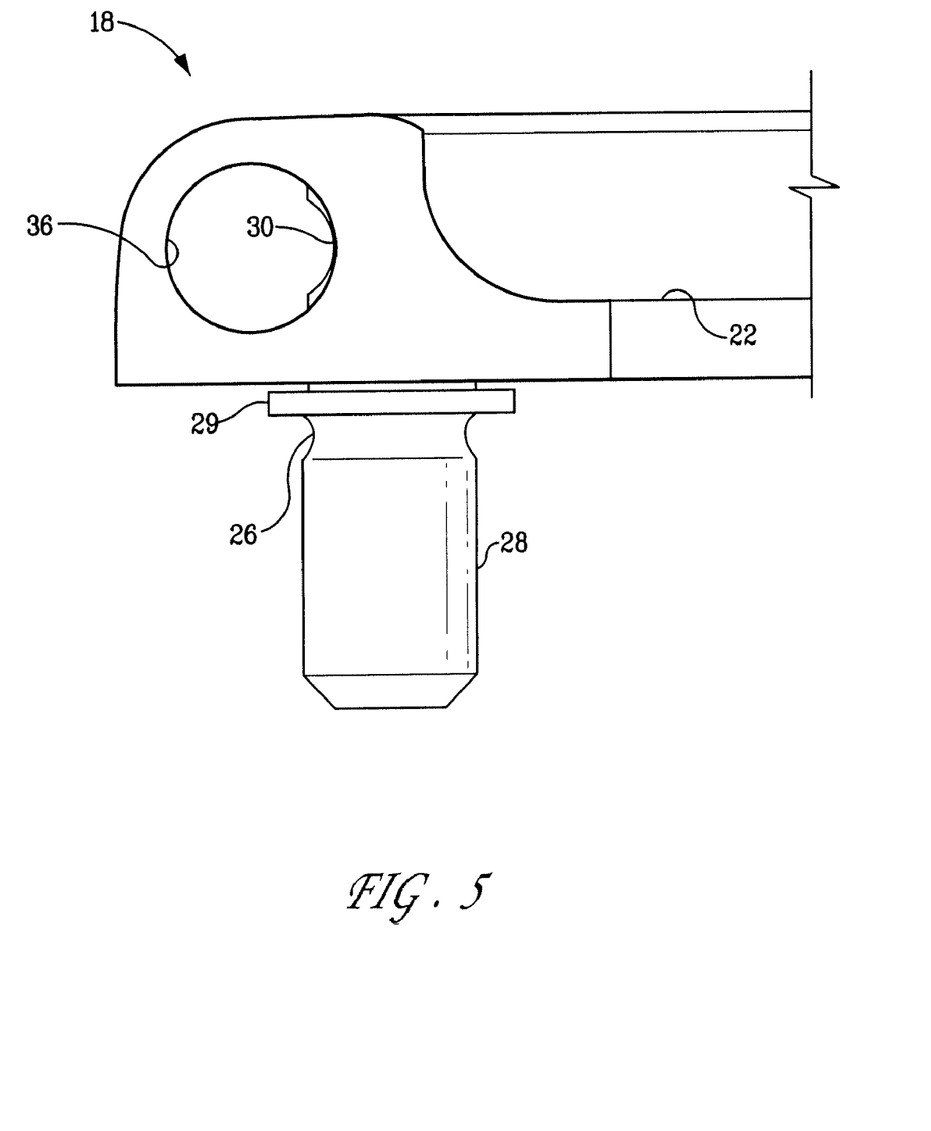
FIG. 5 is an enlarged side view of an end portion of the bridge attached to a pin.
Figure 6:
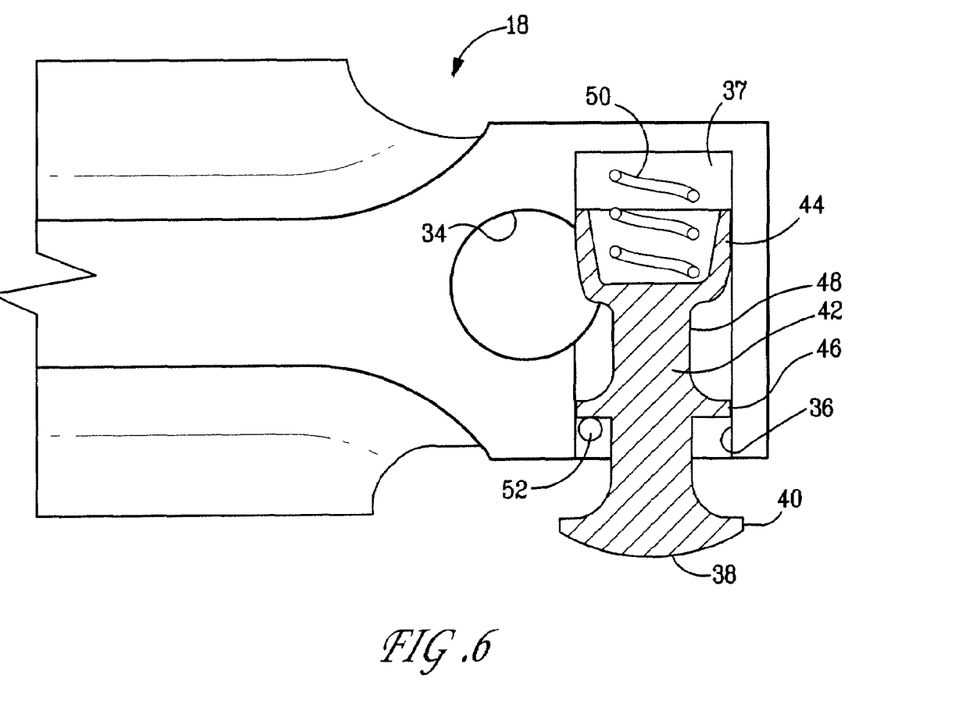
FIG. 6 is an enlarged top view in partial section of the bridge.

On each end of the bridge 18, as seen in FIGS. 3 and 4, a latch assembly 24 is formed. Each end of the bridge 18 has a through hole 34 passing from the top to the bottom of the bridge 18, perpendicular to the sides 22. The through hole 34 is sized to accept the pin 26, as seen in FIGS. 3 and 5. A button hole 36 passes from one side of the bridge 18 to the other side ending in a closed wall. The button hole 36 is perpendicular to the sides 22 and to the through hole 34. The button hole 36 and the through hole 34 connect. A button 38 is received in the button hole 36, as seen in FIGS. 3 and 6.

The button 38 has an enlarged head 40, a central body 42, and a cup shaped end 44. The body 42 has an annular stopping flange 46. A central groove 48 is defined between the cup shaped end 44 and the flange 46. A spring 50 is retained in the cup shaped end 44. The end 44 could also be formed as a flat plate, as long as it forms a biasing surface for the spring 50. A spring pin 52 is retained in the through hole 34 between the button 38 and the pin 26 as seen in FIGS. 6 and 7.

Upon assembly, the button 38 is inserted in the button hole 36 with spring 50 biased between the wall 37 of the hole 36 and the end 44. The spring pin 52 is adjacent to the flange 46 of the button 38 and is supported by the shoulder 29 of the pin 26. By this, the pin 26 protrudes inwardly into the hole 36, as seen in FIG. 5. The latch assembly 24 includes the pin 26, button 38, spring 50, spring pin 52, and the associated holes 34, 36 in the bridge 18. In the normal latch position, the button 38 is biased outwardly against the spring pin 52, as seen in FIG. 3, the right side of FIG. 4, and FIG. 6. By this, the cup shaped end 44 protrudes and interferes with groove 30 of pin 26. This interference holds the bridge 18 onto pins 26 and creates a stiff connection between the bridge 18, and hence the brake pads 20, and the caliper body 12.

To release the bridge 18, the button 38 is compressed, as seen on the left side of FIG. 4. This compresses the spring 50 and allows the groove 48 to align with the pin 26 and allows the head 32 of the pin 26 to pass through the hole 34, thus releasing the bridge 18. This push button release is extremely quick and merely requires a simple compression of the buttons 38. Similarly easy, the bridge 18 is snapped into place by pressing the bridge 18 against the pins 26 to cause the pins 26 to enter the holes 34 and be locked into place by the button 38 when released. As can be appreciated, the connection between the bridge 18 and the caliper body 12 remains secure due to the constant force applied by spring 50 keeping the pin 26 locked to the bridge 18.

Thus, when the brake pads 20 need replacement, the buttons 38 are pressed to release the bridge 18. The bridge 18 is lifted and new brake pads 20 are mounted on the sides 22. The bridge 18 is then snapped back onto the caliper body 12, and the replacement is complete. The process is extremely quick and suitable for fast secure replacement required during automotive racing. In addition, when snapped in place, the bridge 18 is rigidly connected to the caliper body 12 providing a high degree of stiffness.

It will be understood that the embodiments disclosed herein are illustrative only and that the invention encompasses modifications and changes to the particular design features.

What is claimed is:

1. A caliper assembly, comprising:
   a caliper body having side portions and a central opening;
   a bridge releasably secured to the caliper body at the side portions and spanning the central opening;
   at least one brake pad mounted to the bridge and positioned between the side portions within the central opening; and
   a push button latch assembly provided between the caliper body and the bridge including at least one pin protruding from the caliper body, a corresponding hole formed in the bridge into which the pin is releasably retained, and a push button associated with the pin to selectively release the pin from the hole.

2. The caliper assembly of claim 1, wherein the at least one pin includes a pair of pins protruding from the caliper body, with each pin protruding from each side portion of the caliper body.

3. The caliper assembly of claim 1, wherein the at least one push button is retained by the bridge to selectively engage the pin.

4. The caliper assembly of claim 1, wherein the push button is spring biased.

5. The caliper assembly of claim 1, wherein at least one brake pad is a pair of brake pads movable with respect to each other.

6. The caliper assembly of claim 1, in combination with a vehicle.

7. The caliper assembly of claim 1, wherein the bridge is an elongated member with opposed longitudinal sides formed as rails, wherein the brake pad is slidably mounted to the rails.

8. The caliper assembly of claim 1, wherein each side portion of the caliper body has a top surface and the bridge connects to the top surfaces of the side portions.

9. A brake assembly, comprising:
   a caliper body having a pair of side portions with a central opening therebetween;
   a pair of brake pads slidably retained by the caliper body in the central opening; and
   a removable bridge rigidly coupled to the caliper body at the side portions and supporting the pair of brake pads such that the brake pads are suspended from the removable bridge, wherein the removable bridge has a snap release connection at each end that releasably connects to the caliper body,
   wherein the snap release connection includes a pin extending from the caliper body, a button retained in a hole in the bridge, and a spring received in the hole in the bridge and biased against the button, wherein the pin and the button interfere when the button is biased by the spring.

10. The brake assembly of claim 9, wherein the button is mounted for movement in a direction substantially perpendicular to the bridge.

11. The brake assembly of claim 9, wherein the button is mounted for movement in a direction substantially parallel to a braking surface of the brake pads.

12. The brake assembly of claim 9, in combination with a vehicle.

13. A method of replacing brake pads on a vehicle, comprising:
- providing a caliper that supports a brake pad on a bridge mounted to a caliper body;
- compressing a button on the bridge to disconnect the bridge from the caliper body;
- removing the bridge from the caliper body with the brake pad supported on the bridge;
- removing the brake pad from the bridge;
- mounting a replacement brake pad on the bridge; and
- connecting the bridge with the replacement brake pad to the caliper body by snapping the bridge with the replacement brake pad onto the caliper body,
- wherein compressing the button includes disengaging a pin from the button.

14. A method of replacing brake pads on a vehicle, comprising:
- providing a caliper that supports a brake pad on a bridge mounted to a caliper body;
- compressing a button on the bridge to disconnect the bridge from the caliper body;
- removing the bridge from the caliper body with the brake pad supported on the bridge;
- removing the brake pad from the bridge;
- mounting a replacement brake pad on the bridge; and
- connecting the bridge with the replacement brake pad to the caliper body by snapping the bridge with the replacement brake pad onto the caliper body,
- wherein snapping the bridge onto the caliper body includes biasing the button against a pin to create an interference fit.

15. A method of replacing brake pads on a vehicle, comprising:
- providing a caliper that supports a brake pad on a bridge mounted to a caliper body;
- compressing a button on the bridge to disconnect the bridge from the caliper body;
- removing the bridge from the caliper body with the brake pad supported on the bridge;
- removing the brake pad from the bridge;
- mounting a replacement brake pad on the bridge; and
- connecting the bridge with the replacement brake pad to the caliper body by snapping the bridge with the replacement brake pad onto the caliper body,
- wherein removing the bridge from the caliper body includes lifting the bridge in a direction substantially parallel to a braking surface of the brake pad.

16. A brake assembly, comprising:
- a caliper body having a pair of side portions with a central opening therebetween;
- a pair of brake pads slidably retained by the caliper body in the central opening; and
- a removable bridge rigidly coupled to the caliper body at the side portions and supporting the pair of brake pads such that the brake pads are suspended from the removable bridge, wherein the removable bridge has a snap release connection at each end that releasably connects to the caliper body,
- wherein the bridge is an elongated member with opposed longitudinal sides formed as rails, wherein the pair of brake pads are slidably mounted to the rails.

17. A brake assembly, comprising:
- a caliper body having a pair of side portions with a central opening therebetween;
- a pair of brake pads slidably retained by the caliper body in the central opening; and
- a removable bridge rigidly coupled to the caliper body at the side portions and supporting the pair of brake pads such that the brake pads are suspended from the removable bridge, wherein the removable bridge has a snap release connection at each end that releasably connects to the caliper body,
- wherein each side portion of the caliper body has a top surface and the bridge connects to the top surfaces of the side portions.

* * * * *